(12) United States Patent
Kao

(10) Patent No.: US 7,097,681 B2
(45) Date of Patent: Aug. 29, 2006

(54) STRUCTURE OF FILTERING BAG COMBINATION

(75) Inventor: Ying-Shou Kao, Taipei Hsien (TW)

(73) Assignee: Read Yes Enterprises Co., Ltd., Taipei Hsien (TW)

( * ) Notice: Subject to any disclaimer, the term of this patent is extended or adjusted under 35 U.S.C. 154(b) by 123 days.

(21) Appl. No.: 10/458,230

(22) Filed: Jun. 11, 2003

(65) Prior Publication Data

US 2004/0250518 A1    Dec. 16, 2004

(51) Int. Cl.
 *B01D 46/08* (2006.01)
(52) U.S. Cl. .......................... 55/363; 55/365; 55/378; 55/379; 55/492; 55/498; 55/521; 55/529; 210/445; 210/451; 210/453; 210/454; 210/477; 210/479; 210/493.1; 210/497.01
(58) Field of Classification Search .................. 55/361, 55/363, 365, 378, 379, 492, 495, 498, 499, 55/500, 521, 529; 210/445, 451, 453, 454, 210/477, 479, 493.1, 497.01
See application file for complete search history.

(56) References Cited

U.S. PATENT DOCUMENTS 3,853,509 A * 12/1974 Leliaert ..................... 55/341.1
4,259,095 A *  3/1981 Johnson, Jr. ................. 55/302
4,293,111 A * 10/1981 Henri .......................... 248/95
5,173,098 A * 12/1992 Pipkorn ....................... 55/379
5,800,580 A *  9/1998 Feldt ........................... 55/378
5,824,125 A * 10/1998 Sherwood .................... 55/379
6,626,970 B1 *  9/2003 Pipkorn et al. ............... 55/379
6,790,250 B1 *  9/2004 Pipkorn et al. ............... 55/379

* cited by examiner

*Primary Examiner*—Minh-Chau T. Pham
(74) *Attorney, Agent, or Firm*—Troxell Law Office, PLLC

(57) ABSTRACT

An improved filtering bag combination having an increased area of filtering and a longer life of use. The improved structure includes a filtering member with multiple folds to cover a support formed of a plurality of rods. The rods of the support have a plurality of bracing members to support the filtering member, two ends of the support are mounted with two shaping pieces, and an upper and lower lid for fixing and sealing. The bracing members are all serrated members, and are provided on the outside with numerous equidistantly separated crests and corresponding hollows and on the inner side with a connecting base. The crests each have a clamping notch for placing a rod, so that the bracing members can be transversely arranged within a circle formed by encircling the rods of the support.

6 Claims, 7 Drawing Sheets

STRUCTURE OF FILTERING BAG COMBINATION

BACKGROUND OF THE INVENTION

1. Field of the Invention

The present invention is related to an improved structure of filtering bag combination, and especially to an improved structure of filtering bag combination having a good filtering effect, an increased area of filtering and a longer life of use, it suits filtering equipments for various industrial dust collecting systems.

2. Description of the Prior Art

Air pollution can have the polluting materials divided into granular and gas type materials, while the methods for controlling air-polluting materials can also be divided into three kinds of modes. The first mode is the conventional mode; it increases the height of a chimney or renders a factory to move away from an area where population of people is large. Such mode can only solve the problem of air pollution of the area near the factory; this is because that the gross amount of the polluting materials discharged to the atmosphere is unchanged. Particularly the gas $SO_2$, it always is delivered to areas thousand kilometers away and then generates the problem of precipitation of sour rains. The second mode is to add a control equipment before gas is discharged from a pollution source to remove a part of polluted materials before discharging the gas. The concentration of the discharged polluted materials shall meet the statutory standard of discharging in order not to influence the standard of quality of the air in the atmosphere; the removed polluted materials can be recycled for using sometimes. The third mode is the most effective way, this is to change the method and the process of production to inhibit generation of air polluting materials or to lower the concentration of the air polluting materials to a degree to render them unnecessary to be processed before discharging; however, this mode shall consider the problem of the cost of production.

Generally, by the fact that the cost of production and the efficiency of removing the polluting materials shall be both in consideration, people in the art are more often to adopt the second mode; while control equipments can be divided into treatment equipments for granular and gas type materials. Equipments for removing granular materials take advantages of one or some of the following actions: gravity, inertia, centrifugal force, diffusion, filtering, acoustic wave or stationery electric force; they separate and collect particles in the gas, and then discard or reuse them. Taking a usual bag type dust collector as an example, it mainly renders the particles such as of dust etc. to be isolated outside the filtering member after the polluted gas passing the filtering member provided on the dust collector, and cleaner air can be obtained. Usual dust collecting filtering bags can be divided into elongate and cylindrical shape in pursuance of the types of the dust collectors.

By virtue that filtering members are very important in processes of filtering, conventional dust collecting filtering bags can be divided into two kinds, namely a fixed type and a soft type. A bag of the fixed type is made of ventilating molded foam, the structure of the bag is stiff and abrasion durable and can be spray washed, thereby it has a long life of use, a good filtering effect, but it is very expensive; while a filtering bag of the soft type is cheaper, the filtering member it uses is just paper or ventilating cloth; in designing filtering bags, paper or non-woven fabric is used to make an elongate cylinder or a normal cylinder which is slipped over a support; and in practicing, dirt air will pass the cylinder to screen off the particles and dust. However, such filtering mode has a fixed area of filtering, its filtering effect and life of use are extremely limited; therefore, conventional techniques all make the filtering members folded to surround and envelop a support in order to increase the surface area of the filtering members.

However, the conventional filtering bags still have the following flaws:

1. Conventional filtering members can increase the surface area of filtering by folding, however relatively, the papers are thinner and are not so durable for abrasion; and in practicing, they are connected with air exhausting and absorption devices with strong powers, the filtering members are subject to abrasion and damage during exhausting and absorption to thereby shorten the lives of use of them.

2. The filtering members all have folded angles after folding, the folded areas form serrated crests and hollows, they are unable to be unfolded and thereby become dead corners of filtering, dust and particles will be attached to these folded areas and are hard to be removed by tapping; the filtering members are subject to being blocked in use and thereby have their lives of use affected, further by nonstop abrasion of the dust and particles against the dead corners during air exhausting and absorption, this can speedy damage and further shorten the lives of use of the filtering members.

3. Generally, durability against abrasion of non-woven fabric is better than that of paper, but non-woven fabric is softer and thicker, it can not have a fixed shape after folding and even after folding, it is still loose; hence conventional filtering bags made of non-woven fabric can only be made into cylindrical shape rather than being pleated into multiple folds, their filtering areas are too small, they need to be changed often, otherwise, a dust collector shall be enlarged to meet the required filtering area of the filtering bag when in manufacturing the dust collector.

SUMMARY OF THE INVENTION

In view of the above stated flaws of the conventional filtering bags for dust collectors, the inventor of the present invention expected to provide an improved structure of filtering bag for a dust collector, the filtering bag has the area of filtering increased to maintain the best filtering efficiency, and can avoid abrasion and increase the life of use, this is the motive of designing of the present invention.

The primary object of the present invention is to provide an improved structure of filtering bag combination having an increased area of filtering and a longer life of use of itself.

Therefore, in order to achieve the above stated object, the improved structure of filtering bag combination of the present invention provides mainly a filtering member with multiple folds to cover a support formed by surrounding of a plurality of rods, the rods of the support have thereon a plurality of bracing members to support the filtering member, two ends of the support are mounted with two shaping pieces and respectively an upper and a lower lid for fixing and sealing, thereby, the filtering bag combination is completed. The upper lid has an air outlet to connect an external air exhausting equipment. Wherein: the bracing members are all serrated members, and are provided on the outside thereof with numerous equidistantly separated crests and corresponding hollows, on the inner side thereof with a connecting base. The crests have on the top of each of them a clamping notch for placing therein a rod, so that the bracing members can be transversely arranged within a circle formed by encircling of the rods of the support. The filtering member is formed of a ventilating cloth with a series of folds, numerous inner folding areas thereof correspond by position to and are fixed on the hollows of the bracing members stated above; while numerous outer folding areas thereof are supported by the rods. Therefore, after assembling, the folding areas formed by folding of the filtering member will not generate dead corners.

Thereby, when in air drawing after assembling, air having dust therein is filtered through the filtering member to have the dust or powders insulated outside a filtering bag, then the clean air can be drawn out through the upper lid.

The present invention will be apparent after reading the detailed description of the preferred embodiment thereof in reference to the accompanying drawings.

DETAILED DESCRIPTION OF THE PREFERRED EMBODIMENT

Figure 1:
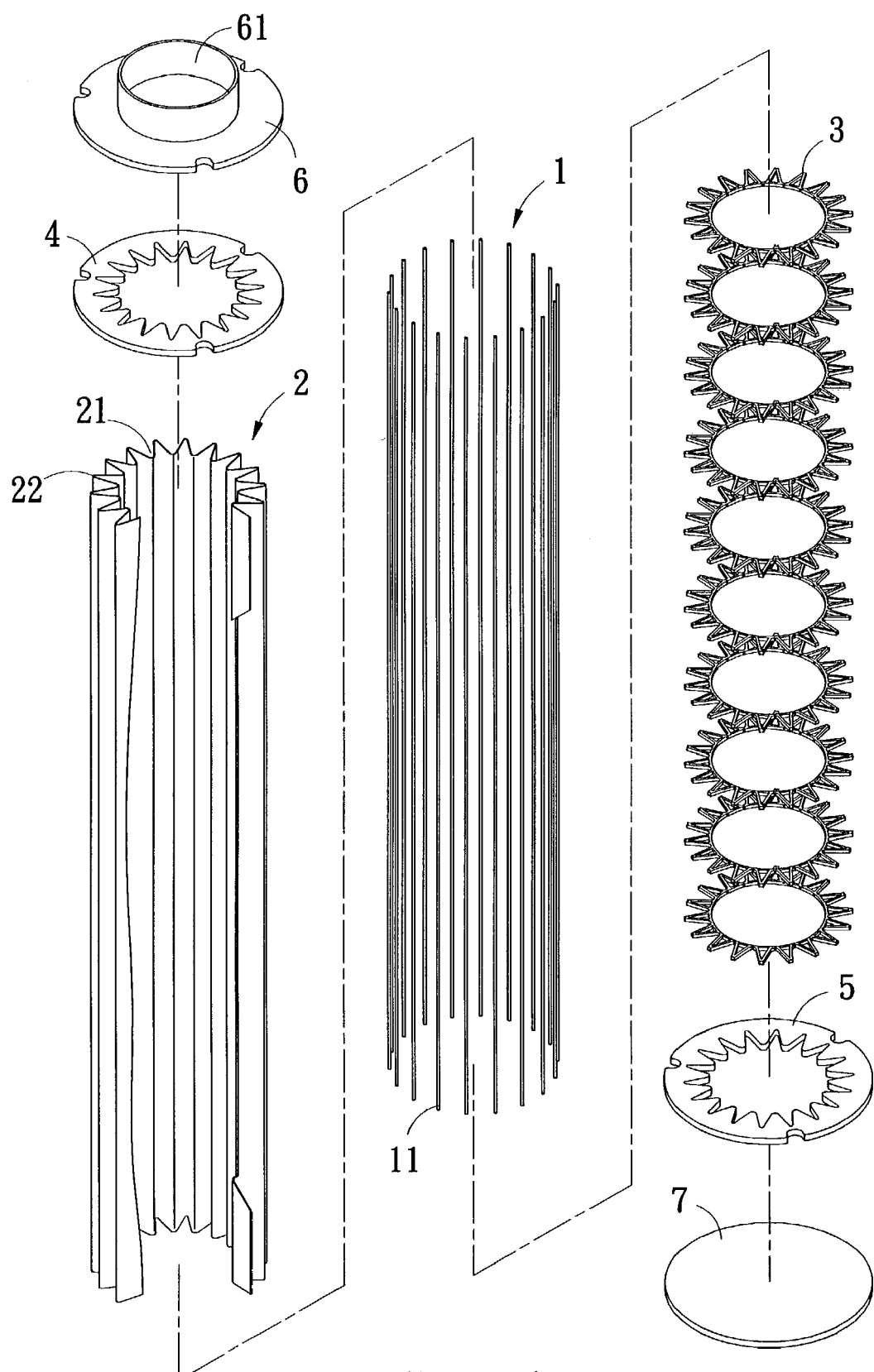
FIG. 1 is an analytic perspective view of an embodiment of the present invention.

Referring firstly to FIGS. 1–3a depicting an embodiment of an improved structure of a filtering bag combination 8 of the present invention, it provides mainly a filtering member 2 with multiple folds to cover a support 1 formed by surrounding of a plurality of spaced rods 11, the support 1 has thereon a plurality of bracing members 3 to support the filtering member 2, two ends of the support 1 are mounted with two shaping pieces 4, 5 and respectively an upper and a lower lid 6, 7 for fixing and sealing, thereby, the filtering bag combination 8 is completed. The upper lid 6 has an air outlet 61 to connect an external air exhausting equipment.

Figure 2:
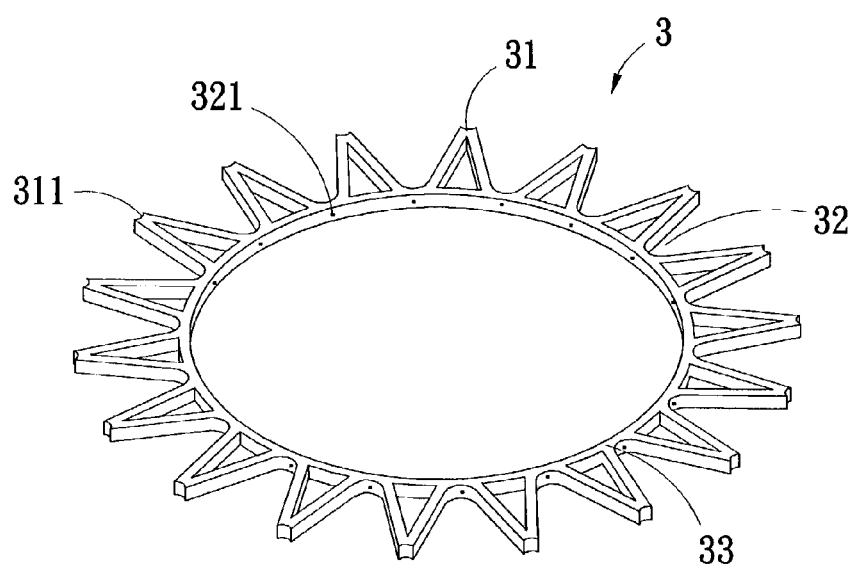
FIG. 2 is a perspective view showing the appearance of a bracing member of the present invention.
Figure 3:
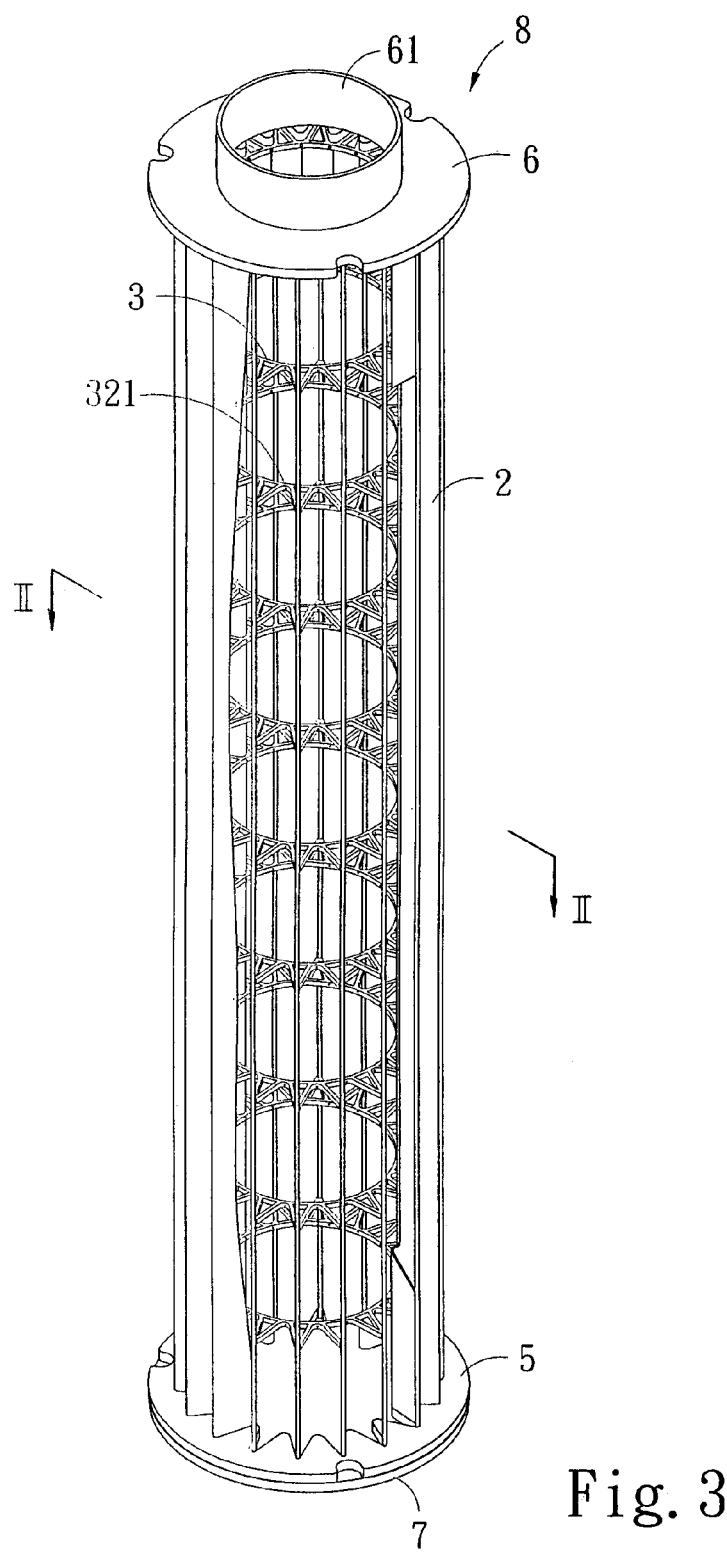
FIG. 3 is a perspective view of the embodiment of the present invention.
Figure 3A:
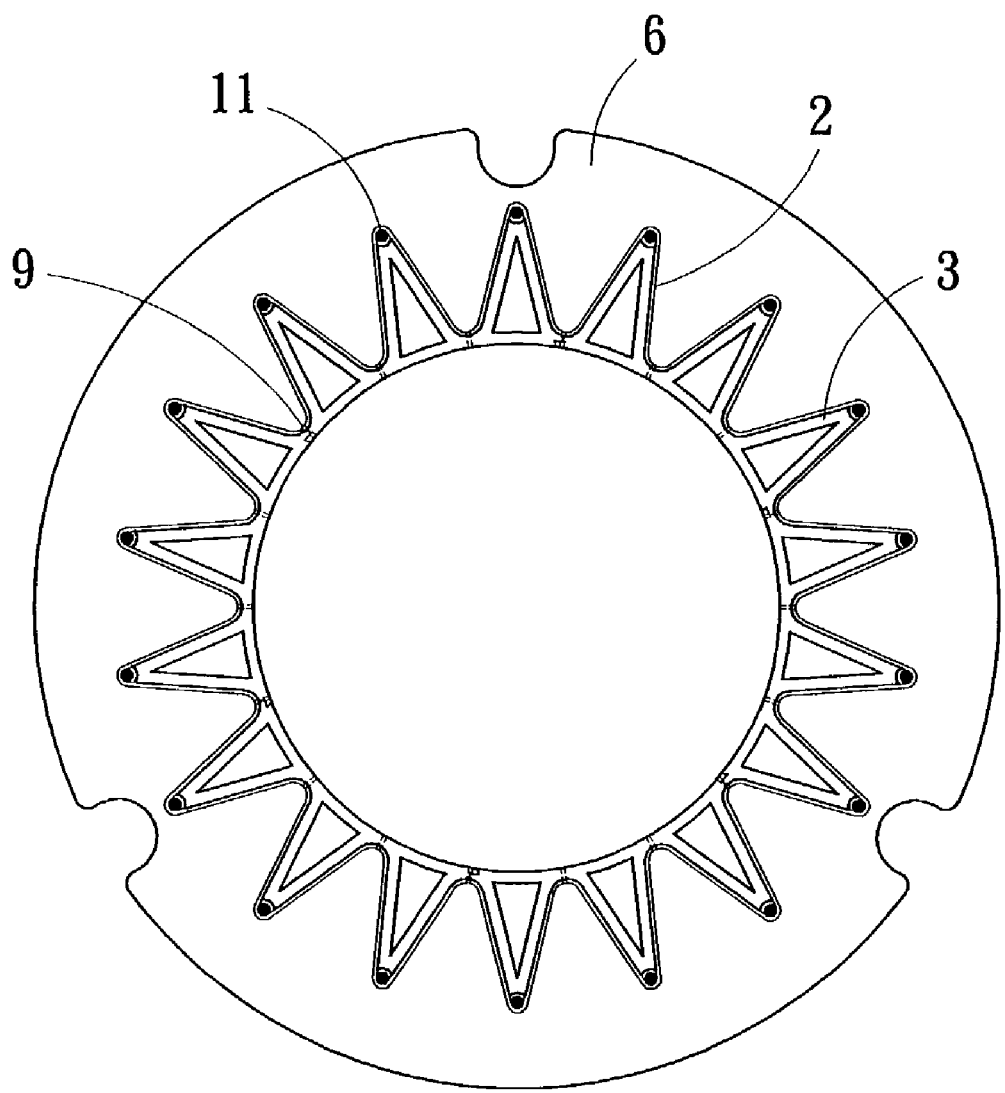
FIG. 3a is a schematic plane view taken from FIG. 3.

Wherein: the bracing members 3 are all serrated members as shown in FIG. 2, and are provided on the outer side thereof with numerous equidistantly separated crests 31 and corresponding hollows 32, on the inner side thereof with a connecting base 33. The hollows 32 each has a hole 321; the crests 31 have on the top of each of them a clamping notch 311 for placing therein a rod 11, so that the bracing members 3 can be transversely arranged and connected on the rods 11 of the support 1. The filtering member 2 is formed of a ventilating cloth (non-woven fabric) with a series of folds, the non-woven fabric is the best for the filtering member 2; when the filtering member 2 is folded, numerous inner folding areas 21 formed on the filtering member 2 correspond by position to and are fixed on the hollows 32 of the bracing members 3 stated above by sticking, or can be fixed on the holes 321 provided on the hollows 32 of the bracing members 3 with rivets 9, and numerous outer folding areas 22 formed on the filtering member 2 are supported by the rods 11. Therefore, after assembling, the filtering member 2 made of the ventilating cloth (non-woven fabric) can be folded at multiple areas to increase the area of filtering of the filtering member 2, and folding of the filtering member 2 will not make the folding areas dead corners.

When in practicing, taking a cylindrical dust collector as an example, the rods 11 are firstly sequentially engaged into the clamping notches 311 on the hollows 32 of the bracing members 3; by spaced arrangement of the bracing members 3 vertically, the rods 11 are braced up to form the cylindrical support 1; then the filtering member 2 made of the non-woven fabric is made a serrated cylinder and placed into the support 1, thereby the folding areas 21 formed on the filtering member 2 correspond by position to the hollows 32 of the bracing members 3, and are fixed on the holes 321 provided on the bracing members 3 with the rivets 9. The inner folding areas 21 are opened and not to make dead corners of filtering. The outer folding areas 22 formed on the filtering member 2 are supported by the rods 11. Thereafter, the two ends of the support 1 are mounted with two shaping pieces 4, 5 which each has a serrated receiving space and arranged respectively on the upper and the lower ends of the support 1 as well as are slipped thereover with the filtering member 2. The folded filtering member 2 in a serrated state has the two ends thereof engaged in the two shaping pieces 4, 5 respectively; lastly, the support 1 are covered with the upper and lower lids 6, 7 to form the filtering bag 8 in the shape of a cylinder. The upper lid 6 has an air outlet 61 to connect an external air exhausting equipment.

Therefore, the filtering bag 8 is made by folding a piece of cloth at multiple areas, the effects of filtering and abrasion durability thereof can be better than those of conventional paper made ones. When the upper lid 6 is connected with an external air exhausting equipment and is activated, the filtering bag 8 forms a sealed space, the dirt air having dust or particles therein is insulated outside of the filtering bag of non-woven fabric, then the clean air can be drawn out through the air outlet 61 of the upper lid 6.

Figure 4:
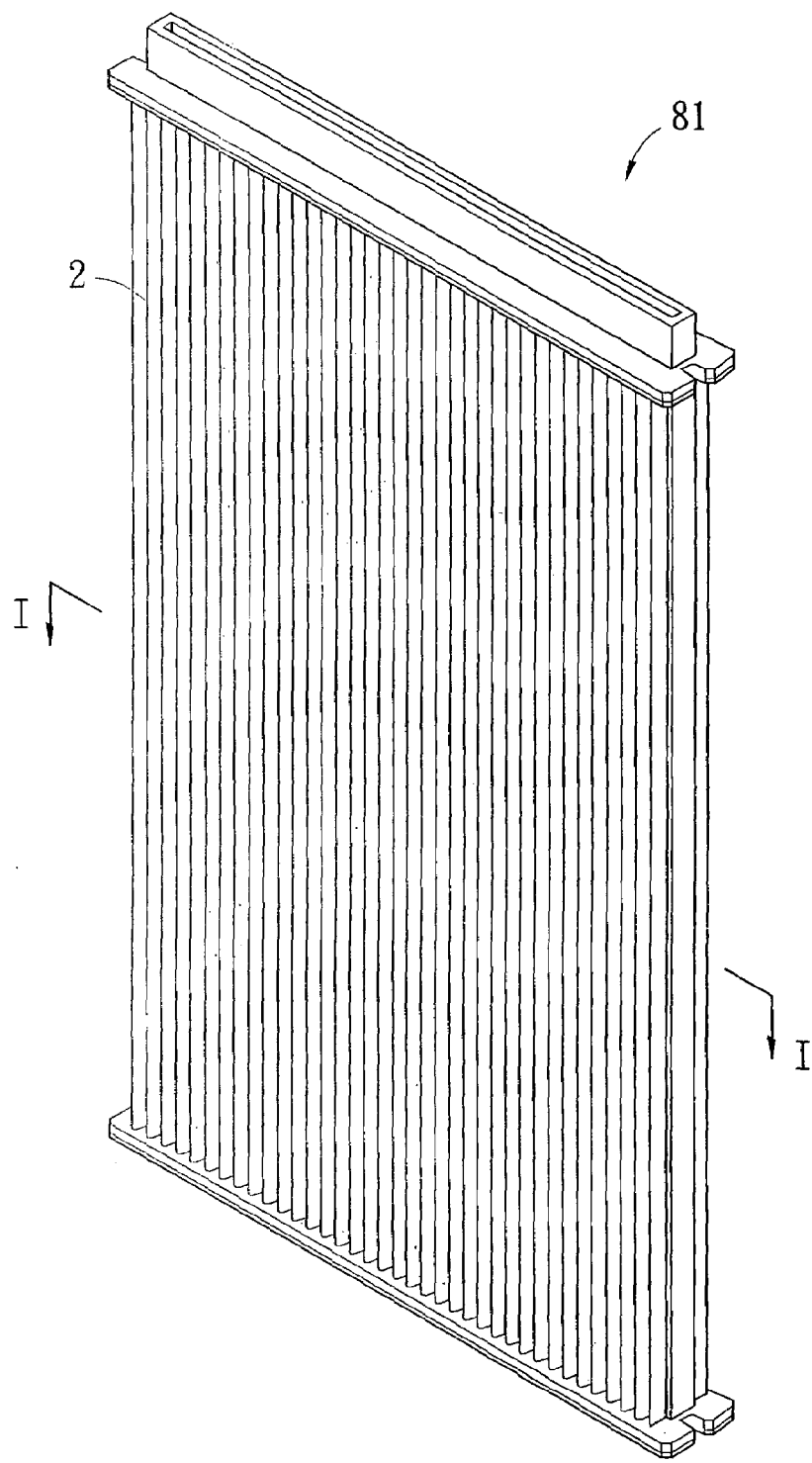
FIG. 4 is a perspective view showing the appearance of a flat barrel-like filtering bag of the present invention.
Figure 4A:
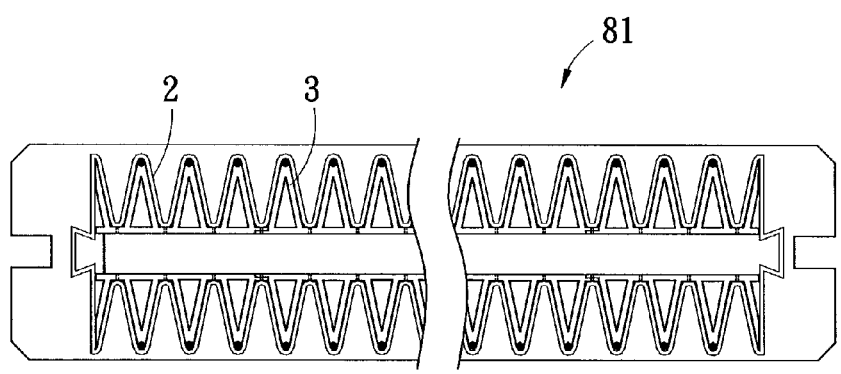
FIG. 4a is a partial exploded sectional schematic view taken from FIG. 4.

Similarly, the shape of the filtering bag 8 can be varied in pursuance of the shape of a dust collector, such as are shown in FIGS. 4, 4a, the filtering bag 81 shown therein is a flat barrel-like filtering bag, it can similarly get the effect of being pleated into multiple folds without making dead corners of filtering.

Figure 5:
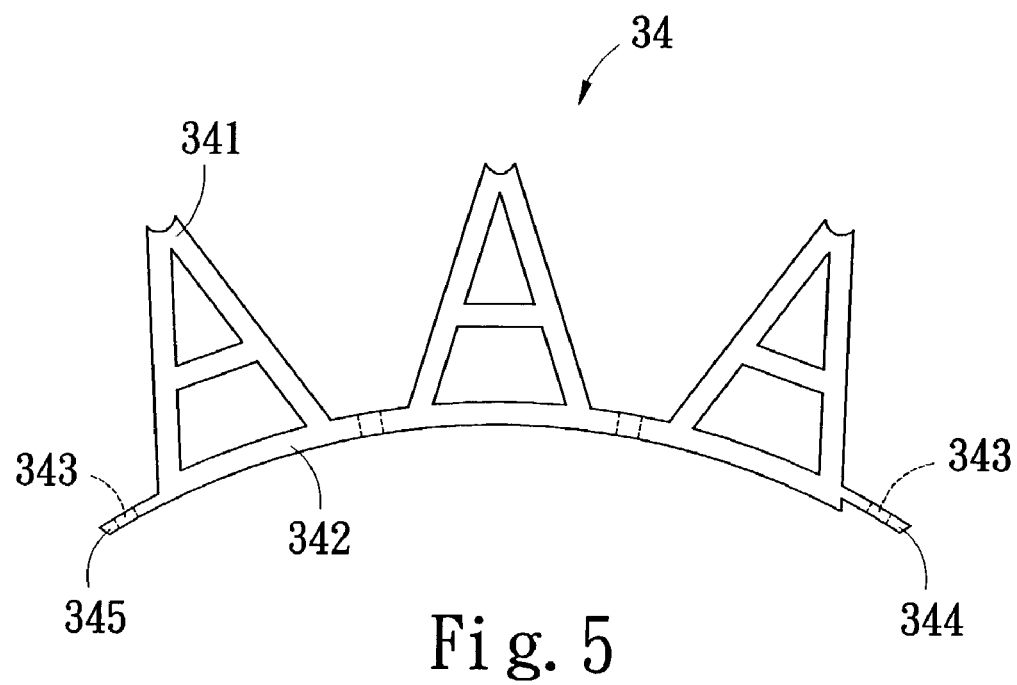
FIG. 5 is a plane view showing the appearance of a part of an arciform base of the bracing member of the present invention.
Figure 6:
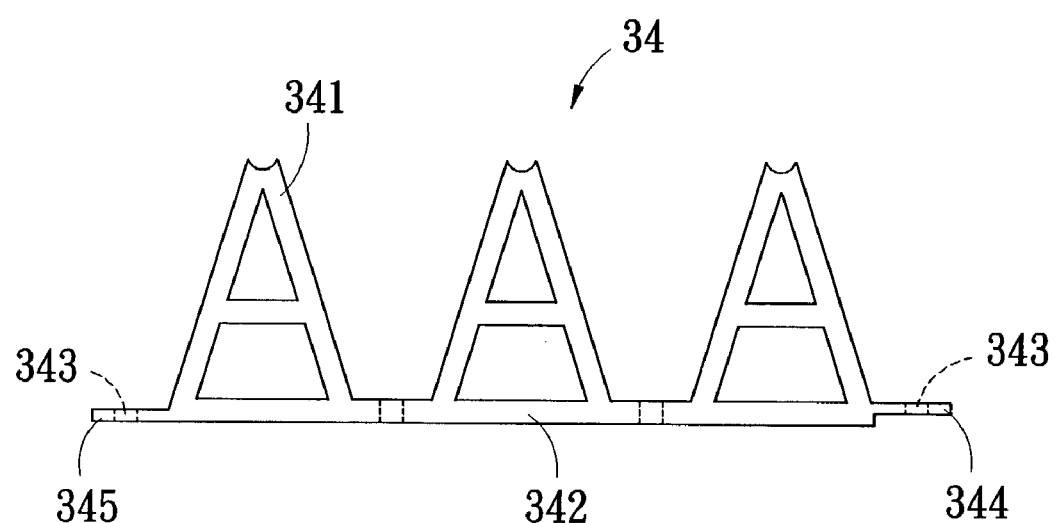
FIG. 6 is a plane view showing the appearance of a part of a straight base of the bracing member of the present invention.

Referring to FIGS. 5 and 6, as are the foregoing examples, the bracing members 3 can also be formed integrally; in requiring a cylinder, it can be made as the shape of the sun (as shown in FIG. 2), or in requiring a flat barrel-like filtering bag, it can be an elongate strip (as shown in FIG. 4a). The better way to do is to render each bracing member 3 to be formed by serially connecting of a plurality of unit pieces 34, each unit piece 34 includes three crests 341 and two hollows, each of the crests 341 is in the form of an "A", a base 342 of the unit pieces 34 has on the two lateral ends thereof two connecting edges 344, 345 with two holes 343 respectively thereon, the base 342 is arciform or straight in pursuance of the shape of the filtering bag 8. The two connecting edges 344, 345 make the thickness of the base 342 when they are stacked with each other, the length of each bracing member 3 can be adjusted in assembling in pursuance of the size of a dust collector to be used for.

The present invention thereby holds the following advantages:
1. The present invention has a support with a plurality of bracing members, and has a filtering member of non-woven fabric fixed on the support, thereby the cloth which can only form a cylinder shape can now be foldable to increase the area of the filtering and the life of use of the present invention.

2. The abrasion durability of the non-woven fabric of the present invention can also largely extend the life of use, and more, the folding angles of the filtering member become more even and smooth, this will not make the folded areas dead corners nor make dust and particles attached to these folded areas, thereby can thoroughly get rid of the flaws in the conventional filtering bags made of paper with multiple folds, which bags are subject to abrading, damage and breaking by the dust and particles.

In conclusion, the present invention can surely achieve its expected object to provide an improved structure of filtering bag having an increased area of filtering, a longer life of use, a good filtering effect and industrial value.

Having thus described my invention, what I claim as new and desire to be secured by Letters Patent of the United States are:

1. A filtering bag structure comprising a filtering member with multiple folds to cover a support formed by surrounding of a plurality of rods, said support has thereon a plurality of bracing members to support said filtering member, two ends of said support are mounted with two shaping pieces and respectively an upper and a lower lid for fixing and sealing, thereby, said filtering bag combination is completed; said upper lid has an air outlet to connect an external air exhausting equipment; wherein:

said bracing members are all serrated members, and are each provided on an outer side thereof with numerous equidistantly separated crests and corresponding hollows, and on an inner side thereof with a straight connecting base, said crests have on the top of each of them a clamping notch for placing therein a rod, said plurality of bracing members are transversely arranged within a polygon formed by positioning said rods of said support;

said filtering member is formed of a ventilating cloth with a plurality of folds, a plurality of inner folding areas thereof corresponding by position to and are fixed on said hollows of said bracing members; a plurality of outer folding areas thereof are supported by said rods, therefore, after assembling, said folding areas formed by folding said filtering member do not generate dead corners.

2. The filtering bag structure as in claim 1, wherein: said ventilating cloth is non-woven fabric.

3. The filtering bag structure as in claim 1, wherein: each of said bracing members is formed integrally.

4. The filtering bag structure as in claim 1, wherein: said hollows of said bracing members have holes for fixing thereon said inner folding areas of filtering member with rivets.

5. The filtering bag structure as in claim 1, wherein: each of said shaping pieces has a serrated receiving space, said folded filtering member in a serrated state has one of two ends engaged in each of said two shaping pieces.

6. The filtering bag structure as in claim 1, wherein: each of said bracing members is formed by serially connecting of a plurality of unit pieces, each of said unit pieces includes three crests and two hollows, each of said crests is in the form of an "A", a base of each of said unit pieces has on two lateral end thereof two connecting edges with two holes respectively thereon, said two connecting edges make the thickness of said base when they are stacked with each other.

* * * * *